3,237,401
REGENERATIVE EXPANDER ENGINE
George T. Peters, Newington, and Ned C. Rice, East Hartford, Conn., assignors to United Aircraft Corporation, East Hartford, Conn., a corporation of Delaware
Filed Jan. 17, 1958, Ser. No. 709,711
7 Claims. (Cl. 60—35.6)

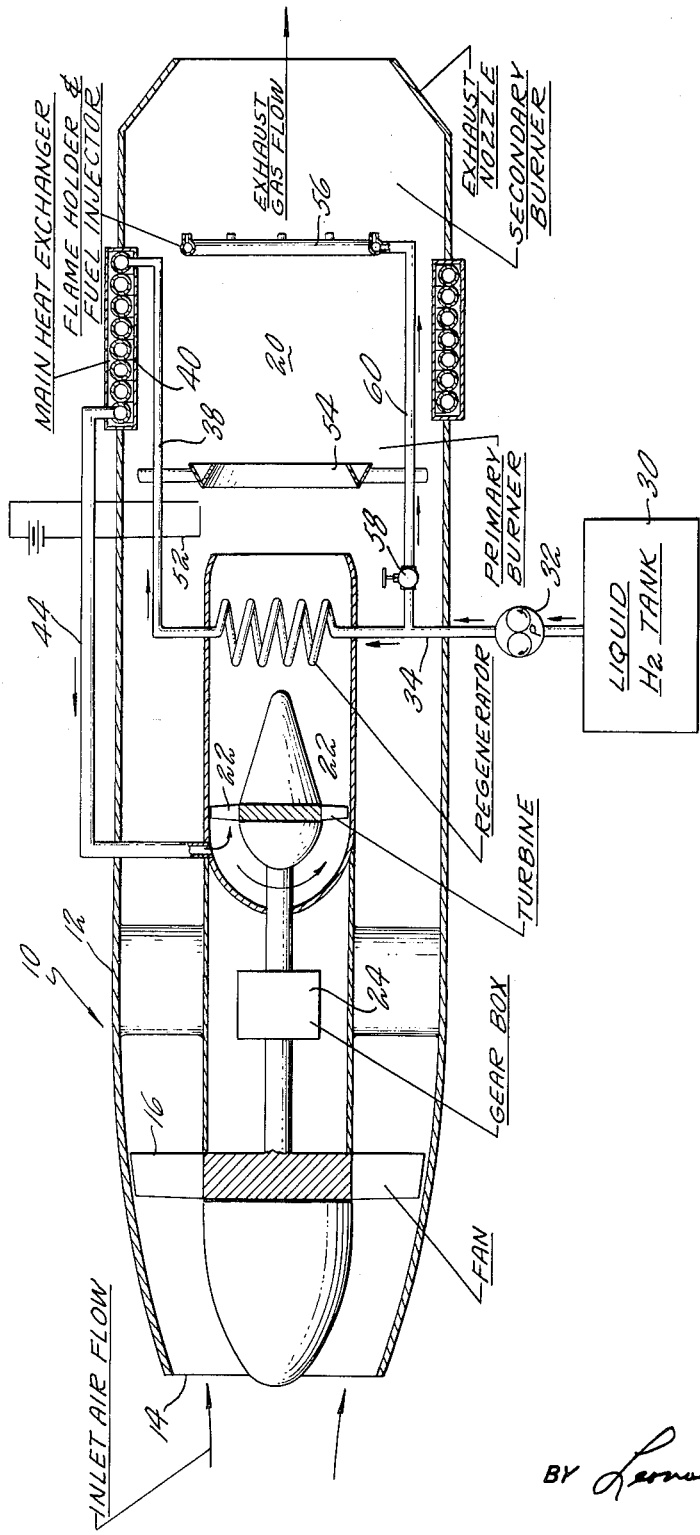

This invention relates to regenerative type open-cycle and hydrogen-expander engines and more particularly to engines of this type wherein liquid hydrogen is the source of fuel in the combustion chambers and the working media in the expander unit.

It is an object of this invention to provide a regenerative type expander engine which utilizes hydrogen as a fuel and as a source of power for driving a turbine and includes a means for regeneratively preheating the working fluid prior to its being passed through the main heat exchanger.

It is a further object of this invention to provide a cycle of the type described whereby the main heat exchanger can be greatly reduced in size and weight so that the over-all weight of the power plant is greatly reduced and the combustion gas flow losses in the main heat exchanger are diminished.

These and other objects of this invention will become readily apparent from the following detailed description of the drawing which is a schematic illustration of a power plant utilizing this invention.

Referring to the drawing, a power plant is generally indicated at 10 as having an outer casing 12 and a main air inlet 14. Air from the inlet 14 is compressed by a compressor 16 and is then passed through the ducting 18 into a primary burner 20. The fan or compressor 16 is driven by a turbine 22 through a reduction gearing 24. The main fuel may be liquid hydrogen or any similar high energy fuel. For this purpose a liquid hydrogen source 30 is provided including a pump 32 for withdrawing liquid hydrogen therefrom and raising its pressure to a high level. The primary flow of fuel is through the pipe 34 and then through the coils of a regenerator 36. The regenerator preheats the fuel prior to its passage to the pipe 38 and the main heat exchanger 40. The partially heated hydrogen when passing through the main heat exchanger 40 receives the rest of the required heat from the hot combustion gas flow from the primary burner 20. The heated hydrogen fuel is then passed through the pipe 44 and expanded through the turbine 22 thereby providing the driving force for the turbine. This expanded fuel then passes in heat exchange relation with the cold fuel in the regenerator 36. There is thus provided a hydrogen-to-hydrogen heat exchange relation at the regenerator 36.

The hydrogen which is partially cooled at the regenerator 36 by passing thereover is then emitted through the exhaust outlet 50 and then into the primary burner 20. The hydrogen flow from the outlet 50 mixes with the air flowing from the passage 18 and is ignited by a suitable spark gap 52 or other suitable means and is burned at the flameholder 54.

Depending upon the conditions of operation, a second flameholder and fuel injector 56 is provided. Here cold hydrogen fuel may be injected into othe exhaust stream to be burned in an afterburner type of operation. The fuel for this afterburner is controlled by a valve 58 in the line 60.

As a result of this invention, the regenerator 36 provides a major portion of the heat addition required by the hydrogen working fluid and thereby the requirements of the main heat exchanger 40 are greatly reduced. This results in a considerable reduction in weight and size. The presence of pure hydrogen on the both sides of the regenerator (heat exchanger 36) results in over-all heat transfer coefficients which are considerably higher than those obtainable with the main heat exchanger 40 where the exchange relation is with combustion products of hydrogen and air on one side and pure hydrogen on the other. The over-all combined weight of the regenerator and the main heat exchanger is considerably lighter than the weight of merely a main heat exchanger with no prior preheating. Furthermore, since the main heat exchanger is reduced in size, lower pressure drops are achieved on the combustion gas side. The effect of these characteristics is to reduce the over-all weight of the engine and enable the engine to operate with lower thrust specific fuel consumption at high Mach numbers and high altitudes. With this type of cycle, the weight and performance of the hydrogen-expander engine type probably approaches that of the hydrogen fueled air turborocket engine type while providing a substantially less complex mechanism as well as operating characteristics.

Although only one embodiment of this invention has been illustrated and described herein, it will become apparent that various changes and modificatioons may be made in the construction and arrangement of the parts without departing from the scope of this novel concept.

What it is desired by Letters Patent is:

1. In a turbine type power plant having an air inlet, a duct leading from said inlet and having an airstream flowing therethrough, a fan in said duct for adding energy to the air in said duct, a combustion section receiving air from said duct, a turbine shielded from said airstream for driving said fan, a source of fuel, a main heat exchanger adjacent to said combustion section which receives fuel from said source for adding heat thereto, means for conducting fuel from said heat exchanger and through said turbine for driving said turbine, an exhaust duct from said turbine and discharging only fuel into said combustion chamber, and a regenerative heat exchanger in said exhaust duct but shielded from the airstream and located upstream of said point of discharge, said regenerative heat exchanger conducting flow of fuel from said source to said first heat exchanger.

2. In a turbine type power plant having an air inlet, a duct leading from said inlet and having an airstream flowing therethrough, a fan in said duct for adding energy to the air in said duct, a combustion section receiving air from said duct, a turbine shielded from said airstream for driving said fan, a source of normally gaseous fuel in a liquid state, a first heat exchanger adjacent to said combustion section which receives fuel from said source for adding heat thereto, means for conducting fuel from said heat exchanger and through said turbine for driving said turbine by expansion of the fuel therethrough, an exhaust duct from said turbine comprising a central passage in the duct leading from said inlet, and a regenerative heat exchanger in said exhaust duct but shielded from the airstream, said regenerative heat exchanger conducting flow of fuel from said source to said first heat exchanger.

3. In a turbine type power plant having an air inlet, a duct leading from said inlet and having an airstream flowing therethrough, a fan in said duct for adding energy to the air in said duct, a combustion section receiving air from said duct, a central body in said duct terminating upstream of said combustion section, a turbine shielded from said airstream for driving said fan and located in said body, a source of normally gaseous fuel in a liquid state, a first heat exchanger adjacent to said combustion section which receives fuel from said source for adding heat thereto, means for conducting fuel from said heat exchanger and through said turbine for driving said turbine by expansion of the fuel therethrough, an exhaust duct from said turbine, and a regenerative heat exchanger in said exhaust duct but shielded from the airstream by the walls of said central body, said regenerative heat exchanger conducting flow of fuel from said source to said first heat exchanger, the fuel exhausted from said turbine passing through said regenerative heat exchanger and out into said combustion section for mixing and burning with the air from said duct.

4. In a turbine type power plant having an air inlet, a duct leading from said inlet and having an airstream flowing therethrough, a fan in said duct for adding energy to the air in said duct, a combustion section receiving air from said duct, a turbine shielded from said airstream for driving said fan, a source of normally gaseous fuel in a liquid state, a first heat exchanger adjacent said combustion section receiving fuel from said source and adding heat thereto, means for conducting fuel from said heat exchanger and through said turbine for driving said turbine by expansion of the fuel therethrough, an exhaust duct from said turbine, and a regenerative heat exchanger shielded from the airstream and located in said exhaust duct, said regenerative heat exchanger conducting flow of fuel from said source to said first heat exchanger whereby said regenerative heat exchanger provides a relatively cold fuel-to-hot-fuel heat exchange relation.

5. In a turbine type power plant having an air inlet, a duct leading from said inlet and having an airstream flowing therethrough, a fan in said duct for adding energy to the air in said duct, a combustion section receiving air from said duct, a turbine shielded from said airstream for driving said fan, a source of normally gaseous fuel in a liquid state, a first heat exchanger in heat exchange relation with the hot gas flowing through said combustion section, said heat exchanger conducting fuel from said source for adding heat thereto, means for conducting fuel from said heat exchanger and through said turbine for driving said turbine by expansion of the fuel therethrough, an exhaust duct for said turbine having only fuel flowing therethrough, and a regenerative heat exchanger in said exhaust duct but shielded from the airstream, said regenerative heat exchanger conducting flow of fuel from said source to said first heat exchanger whereby said regenerative heat exchanger provides a fuel-to-fuel heat exchange relation.

6. In a turbine type power plant having an air inlet, a duct leading from said inlet and having an airstream flowing therethrough, a fan in said duct for adding energy to the air in said duct, a combustion section receiving air from said duct, a turbine shielded from said airstream for driving said fan, a source of normally gaseous fuel in a liquid state, a first heat exchanger in heat exchange relation with the hot gas flowing through said combustion section, said heat exchanger conducting fuel from said source for adding heat thereto, means for conducting fuel from said heat exchanger and through said turbine for driving said turbine by expansion of the fuel therethrough, an exhaust duct for said turbine having only fuel flowing therethrough, a regenerative heat exchanger in said exhaust duct but shielded from the airstream, said regenerative heat exchanger conducting flow of fuel from said source to said first heat exchanger whereby said regenerative heat exchanger provides a fuel-to-fuel heat exchange relation, means in said combustion section for burning the mixture of air from said duct and the fuel from said regenerative heat exchanger in said combustion chamber to provide the hot gases for said first heat exchanger.

7. In a turbine type power plant having an air inlet, a duct leading from said inlet and having an airstream flowing therethrough, a fan in said duct for adding energy to the air in said duct, a combustion section receiving air from said duct, a turbine shielded from said airstream for driving said fan, a source of normally gaseous fuel in a liquid state, a first heat exchanger in heat exchange relation with the hot gas flowing through said combustion section, said heat exchanger conducting fuel from said source for adding heat thereto, means for conducting fuel from said heat exchanger and through said turbine for driving said turbine by expansion of the fuel therethrough, an exhaust duct for said turbine having only fuel flowing therethrough, a regenerative heat exchanger in said exhaust duct in heat exchange relation with the fuel flowing in said turbine exhaust duct, said regenerative heat exchanger conducting flow of fuel from said source to said first heat exchanger whereby said regenerative heat exchanger provides a fuel-to-fuel heat exchange relation, means for burning the fuel from said regenerative heat exchanger in said combustion chamber, and means for diverting a portion of the fuel from said source and injecting said diverted fuel at a point in said combustion section downstream of said fuel burning means.

References Cited by the Examiner
UNITED STATES PATENTS

| | | | |
|---|---|---|---|
| 2,483,045 | 9/1949 | Harby | 60—35.6 |
| 2,602,289 | 7/1952 | Anxionnaz et al. | 60—39.46 X |
| 2,620,625 | 12/1952 | Phaneuf | 60—35.6 |
| 2,694,899 | 11/1954 | Hague | 60—39.71 X |

MARK NEWMAN, *Primary Examiner.*

SAMUEL FEINBERG, *Examiner.*